(12) United States Patent
Spio

(10) Patent No.: US 7,065,355 B2
(45) Date of Patent: Jun. 20, 2006

(54) METHOD AND APPARATUS FOR VERY HIGH DATA RATE SATELLITE TRANSMISSION

(75) Inventor: Mary A. Spio, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 536 days.

(21) Appl. No.: 10/348,454

(22) Filed: Jan. 21, 2003

(65) Prior Publication Data
US 2004/0141530 A1  Jul. 22, 2004

(51) Int. Cl.
H04B 7/185 (2006.01)
H04Q 7/20 (2006.01)

(52) U.S. Cl. .................. 455/428; 455/427; 455/12.1; 370/535

(58) Field of Classification Search ........ 455/427–428, 455/430, 3.02–3.03, 3.05–3.06, 12.1, 13.1, 455/13.3; 342/352; 370/316, 532, 535–536; 348/487, 491–492, 734
See application file for complete search history.

(56) References Cited

U.S. PATENT DOCUMENTS

| | | | | |
|---|---|---|---|---|
| 5,319,707 A | * | 6/1994 | Wasilewski et al. | 380/212 |
| 5,659,350 A | * | 8/1997 | Hendricks et al. | 725/116 |
| 5,751,338 A | * | 5/1998 | Ludwig, Jr. | 348/14.12 |
| 6,363,061 B1 | * | 3/2002 | Yuzawa | 370/345 |
| 6,433,904 B1 | * | 8/2002 | Swanson et al. | 398/91 |
| 6,549,528 B1 | * | 4/2003 | Yuzawa | 370/345 |
| 6,574,794 B1 | * | 6/2003 | Sarraf | 725/63 |
| 6,606,307 B1 | * | 8/2003 | Chang et al. | 370/316 |
| 6,741,834 B1 | * | 5/2004 | Godwin | 455/3.01 |
| 6,792,615 B1 | * | 9/2004 | Rowe et al. | 725/37 |
| 6,836,658 B1 | * | 12/2004 | Sharon et al. | 455/429 |
| 6,885,675 B1 | * | 4/2005 | Gibbings | 370/433 |
| 2003/0025971 A1 | * | 2/2003 | Price et al. | 359/181 |
| 2004/0037290 A1 | * | 2/2004 | Valadarsky et al. | 370/395.1 |
| 2005/0002671 A1 | * | 1/2005 | Smith et al. | 398/83 |
| 2005/0220180 A1 | * | 10/2005 | Barlev et al. | 375/222 |

* cited by examiner

Primary Examiner—Binh K. Tieu
(74) Attorney, Agent, or Firm—Gates & Cooper LLP (57) ABSTRACT

A method and apparatus for broadcasting a data stream is disclosed. The method comprises the steps of inverse multiplexing the data stream into a first component data stream and a second component data stream and providing the first component data stream to a first transponder and providing the second component data stream to a second transponder. The apparatus comprises an inverse multiplexer, communicatively coupled to the data stream, for separating the data stream into a first component data stream and a second component data stream; an uplink transmitter, for providing the first component data stream to a first transponder and providing the second component data stream to a second transponder.

60 Claims, 8 Drawing Sheets

METHOD AND APPARATUS FOR VERY HIGH DATA RATE SATELLITE TRANSMISSION

BACKGROUND OF THE INVENTION

1. Field of the Invention

The present invention relates to systems and methods for transmitting information and in particular to a method and apparatus for transmitting data at high rates in systems having multiple transponders.

2. Description of the Related Art

Data objects can be transmitted from a location to another a variety of ways, including the use of the modems and public switched telephone network (PSTN), dedicated landlines, terrestrial microwave systems, and satellite systems.

Satellite systems are particularly well suited for use in situations where the data is to be transmitted to multiple receivers or subscribers (e.g. "broadcasted" rather than just transmitted). In recent years, it has become increasingly desirable to transmit larger and larger data objects (high resolution movies suitable for public display, for example) from one place to multiple locations in a short amount of time.

Data rates can be increased by using more powerful or wider bandwidth transponders. However, transmission bandwidth cannot be increased beyond assigned frequency bands, and highly powerful transponders are expensive or impossible to produce. Further, once deployed, satellite systems cannot be easily modified to permit higher data rate transmissions.

There is therefore a need for a system and method for transmitting data at high rates to multiple receivers without requiring deployment of additional satellites or modifying the satellites. The present invention satisfies that need.

SUMMARY OF THE INVENTION

To address the requirements described above, the present invention discloses a method and apparatus for transmitting a data stream. The method comprises the steps of inverse multiplexing the data stream into a first component data stream and a second component data stream and providing the first component data stream to a first transponder and providing the second component data stream to a second transponder.

The apparatus comprises an inverse multiplexer, communicatively coupled to the data stream, for separating the data stream into a first component data stream and a second component data stream; an uplink transmitter, for providing the first component data stream to a first transponder and providing the second component data stream to a second transponder, and a receiver, which comprises a tuner for receiving the first component data stream from the first transponder and the second component data stream from the second transponder and a processor, communicatively coupled to the tuner. The processor reconstructs the data stream from the received first component data stream and the received second component data stream by interleaving the first component data stream and the second data stream.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Video Distribution System

Figure 1:
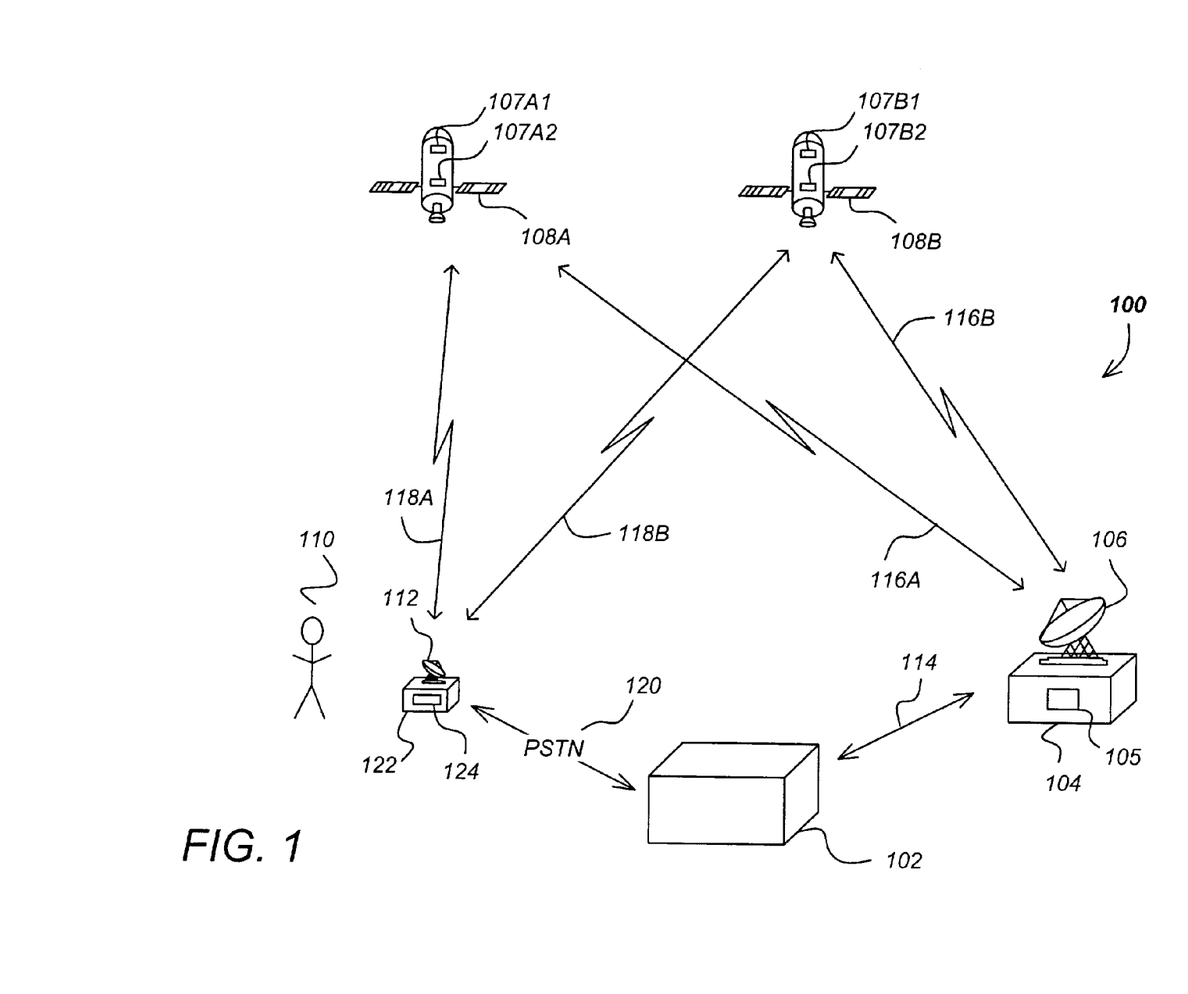
FIG. 1 is a diagram illustrating an overview of the data distribution system.

FIG. 1 is a diagram illustrating an overview of a data distribution system 100. The video distribution system 100 comprises a control center 102 in communication with one or more uplink center(s) 104 via a ground or other link(s) 114 and with receivers 124 at receiver stations 122 such as theaters displaying program material to viewers 110 via a public switched telephone network (PSTN) or other link 120. The control center 102 provides program material to the uplink center(s) 104, coordinates with the receiver stations 122 to display audiovisual information to the viewers 110. Associated functionality, including billing for video programs, encryption/decryption, and assuring the security of the video programs is also provided by the control center 102.

In the illustrated embodiment, the control center 102 and the uplink center 104 are shown as geographically separate entities. However, the functionality of the control center 102 and uplink center(s) 104 can be integrated within a single facility. Further, although FIG. 1 depicts that the program material is transmitted from the control center 102 to the uplink center 104 via a ground link 114, the program material can be delivered to the uplink center 104 in tangible form by messenger, by satellite or terrestrial transmission, or by any secure means.

The uplink center receives program material and program control information from the control center 102, and using one or more uplink antennae 106 and transmitter module(s) 105, transmits the program material and program control information to one or more satellite(s) 108A and 108B (hereinafter alternatively referred to as satellite or satellites 108).

Collectively, the satellites 108 of the video distribution system 100 include a plurality of transmitters. In one embodiment, the transmitters comprise transponders 107A1–107B2, which receive the signal from the uplink center 104 at a particular frequency, and transpond the signal to the receiver station(s) 122. Since this involves minimal satellite 108 processing, this is sometimes referred to as a "bent-pipe" transmission system.

Multiple transponders 107A1–107B2 can be implemented in the video distribution system 100 by including more than one transponder on a single satellite (e.g. 107A1 and 107A2 on satellite 108A), or a single transponder on a plurality of satellites (e.g. transponder 107A1 on satellite 108A and transponder 107B1 on satellite 108B), or by including more than one transponder on more than one satellite (e.g. transponders 107A1 and 107A2 on satellite 108A and transponders 107B1 and 107B2 on satellite 108B).

Each of the satellite transponders (hereinafter alternatively collectively referred to as transponder(s) 107) receives a signal from the uplink center 104 (via link 116A or 116B) transmits the signal to the subscribers 110. The subscriber 110 receiving station receives this information using the subscriber antenna 112.

While the invention disclosed herein will be described with reference to a satellite based video distribution system 100, the present invention may also be practiced with terrestrial-based transmission of program information, whether by broadcasting means, cable, or other means. Further, the different functions collectively allocated among the control center 102, uplink center 104, and/or the receiver stations 122 as described above, and can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information or computer data as well.

Figure 2:
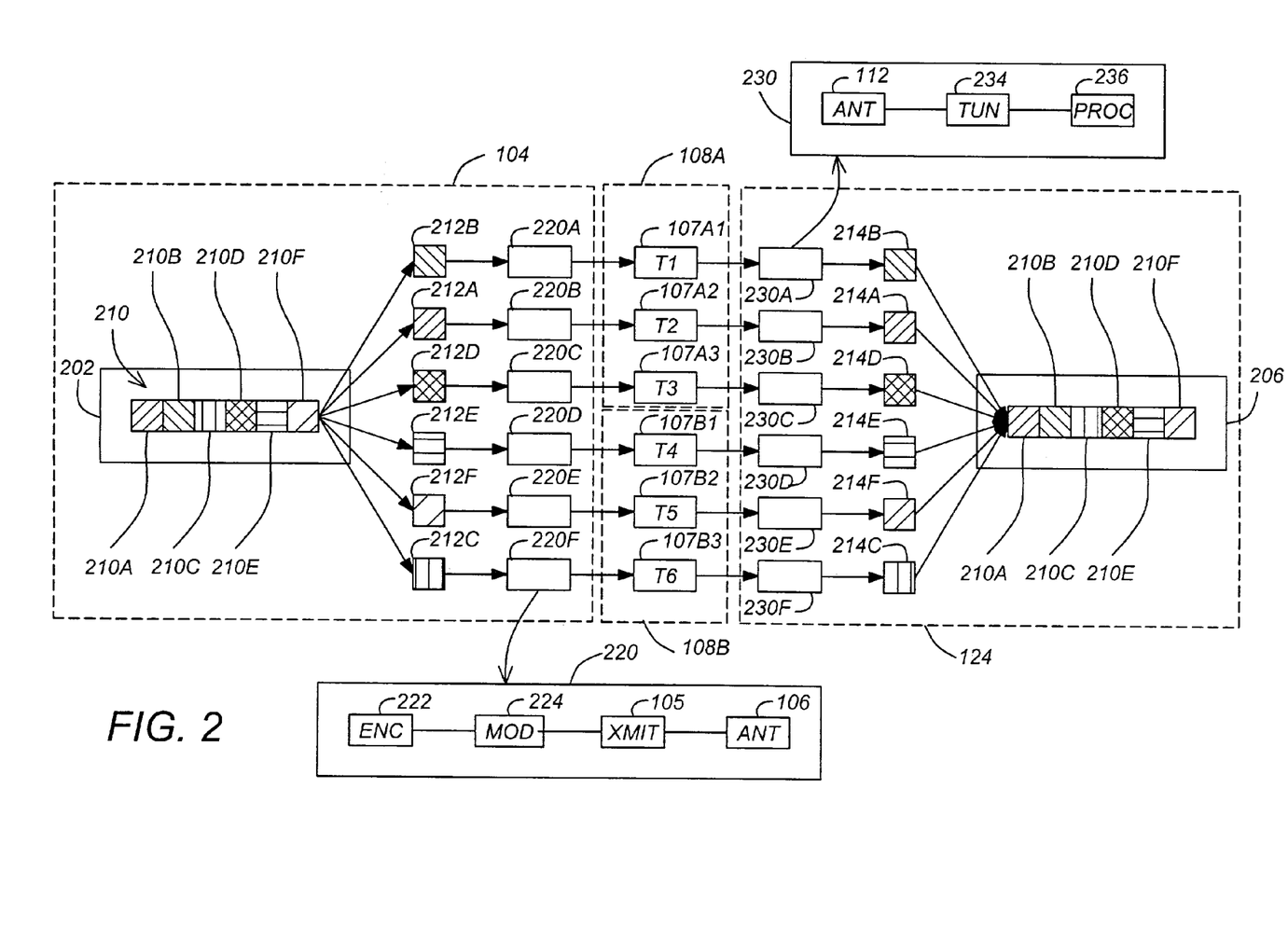
FIG. 2 is a diagram showing the transmission of a data stream using the data distribution system.

FIG. 2 is a diagram showing the transmission of a data stream using the video distribution system 100. The uplink center 104 includes an inverse multiplexor 202. The inverse multiplexor 202 accepts an input data stream 210 and separates the input data stream into a plurality of component data streams 212A–212F. This is accomplished by designating a first contiguous portion of the data stream 210A as a member of the first component data stream 212A, and designating a second contiguous portion of the data stream 210B as a member of the second component data stream 212B. In one embodiment, the each contiguous portion of the input data stream 210A–210F is associated with an identifier before being separated into separate component data streams 212A–212F. This permits the data in the component data streams 212A to be reassembled in the proper temporal relationship compared to other data in the component data streams by the receiving station 122. This process is described further below.

The component data streams 212A–212F are provided to the transmitter module(s) 105. In one embodiment, each transmitter module 105 includes a plurality of transmitter channels 220A–220F, each for transmitting one of the component data streams 212A–212F. Each transmitter channel 212A–212F includes an encryption module 222 for encrypting the component data stream 212A–212F, a modulator 224 communicatively coupled to the encryption module 222, transmitter 226, and antenna 228. Of course, the functionality of each of the encryption modules 222, modulators 224, transmitters 226 and antennae can be combined into a single unit (e.g. one encryption module 222, one modulator 224, one transmitter 226, and or one antennae 228) operating on all component data streams 212A–212F in parallel or series). For example, a widebeam antennae 228 can be used to transmit information from all component data streams to different satellites (e.g. 108A and 108B) if the beamwidth of the antennae 228 is wide enough to include both satellites 108A and 108B).

The transmitted component data streams 212A–212F are received and retransmitted (e.g. transponded) by transponders 107 to the receiver station 122. The receiving station 122 includes a receiver module 124. The receiver module 124 includes a plurality of channel receivers 230A–230F. In one embodiment, the channel receivers 230A–230F each include an antenna 112, a tuner, 234 and a processor 236 for controlling the reception of the downlink signal from the satellites 108. Each of the channel receivers 230A–230F provides a received component signal 214A–214F, respectively, which is provided to a multiplexor 206.

The multiplexor 206 assembles the receives the component data streams 214A–214F to reconstruct the input data stream 210A–210F. In one embodiment, this is accomplished using the identifiers included in each component data stream, as described further below. In another embodiment, the input data stream 210A–210F is reconstructed from the received component data streams 214A–214F in other ways, including a periodically transmitted map, or by inferring the order that the elements of the received component data streams 214A–214F from the content of the data itself.

While the foregoing has been described with respect to channel receivers 230A–230F each having separate antennae 112, tuners 234, and processors 236, operations performed by the receiver station 122 can be integrated into fewer elements. For example, the receiver station 122 may comprise two antennae (a first antenna oriented to receive communications from satellite 108A and a second antenna oriented to receive communications from satellite 108B), or an antenna with multiple sensing elements sharing a single reflector capable of collecting radiant energy transmitted from both the first satellite 108A and the second satellite 108B. Further, a single tuner 234 can be used to receive each of the component data streams, one at a time, or two tuners (one for each satellite 108) can be used. Finally, the receiver station 230 may include only a single processor 236 which performs all of the necessary functions, including the control of the tuners 234 and antennae 112 to receive the component data streams 214A–214F.

Figure 3:
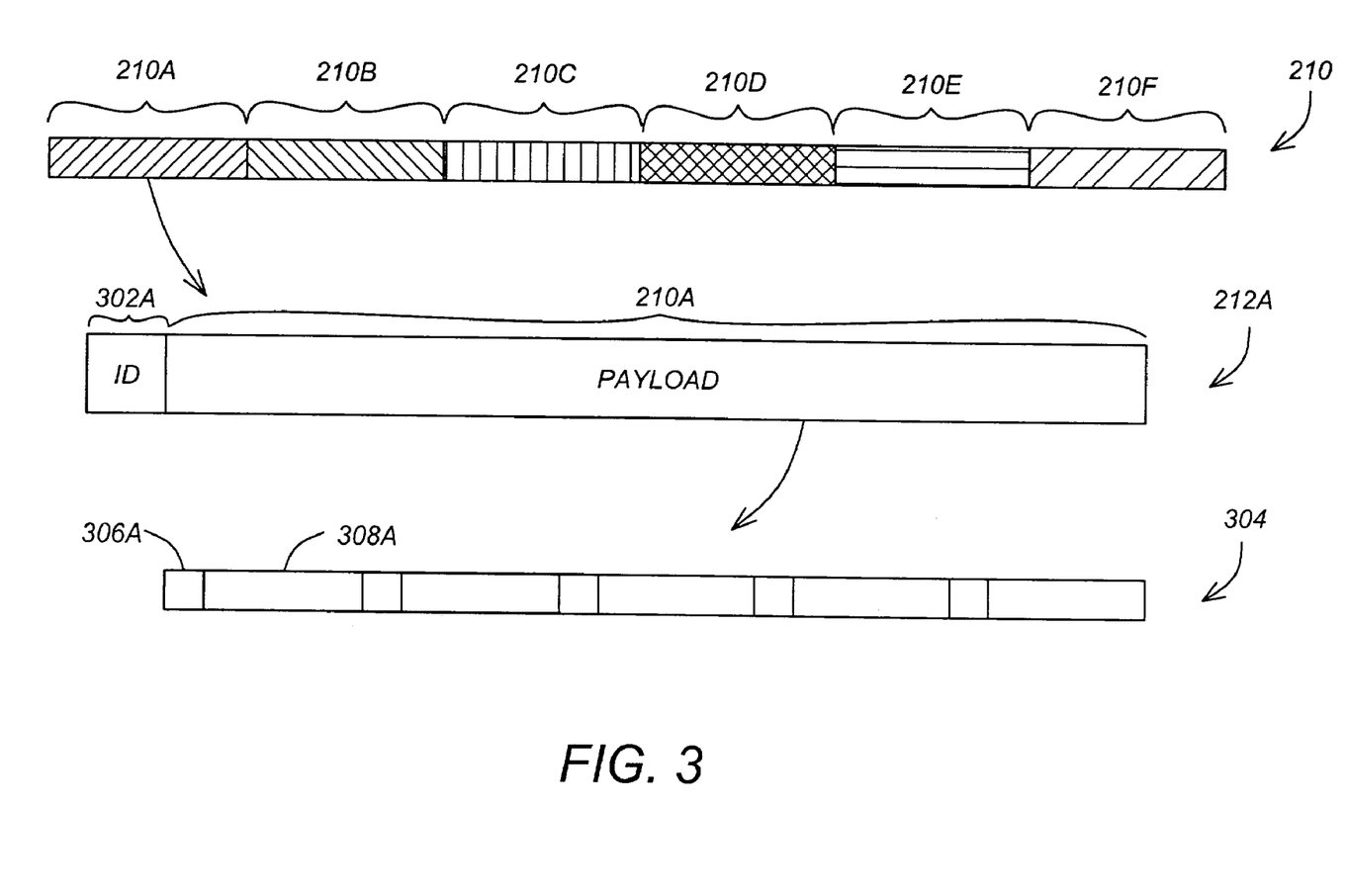
FIG. 3 is a diagram illustrating one embodiment of the process of inverse multiplexing the input data stream into a plurality of contiguous component data streams.

FIG. 3 is a diagram illustrating one embodiment of the inverse multiplexing of the input data stream 210 into a plurality of contiguous component data streams. As described earlier in FIG. 2, the input data stream 210 is separated into a plurality component data streams 212A–212F. A first contiguous portion 210A of the data stream is associated with a first identifier 302A. In the illustrated the first identifier 302A is added to the beginning of the payload (the first contiguous portion of the data stream 210A), however, the first identifier 302A could be appended to the end of the payload, placed within the payload, or coded into the payload, using techniques similar to those used in digital watermarking. It is noted that the identifier 302 used to reassemble the component data streams 214A–214F can simply be a serial number, which can cycle up to a maximum value and repeat at the beginning. In this embodiment, the number of serial numbers in the period should be sufficient to assure unambiguous identification of the component data streams and reassembly to reconstruct the input data stream. Also, as shown in FIG. 3, each payload can include multiple data packets, each including a header 306A as well as program material 308A. In this way, the present invention can be implemented using a wide variety of transmission protocols without modification.

Figure 4:
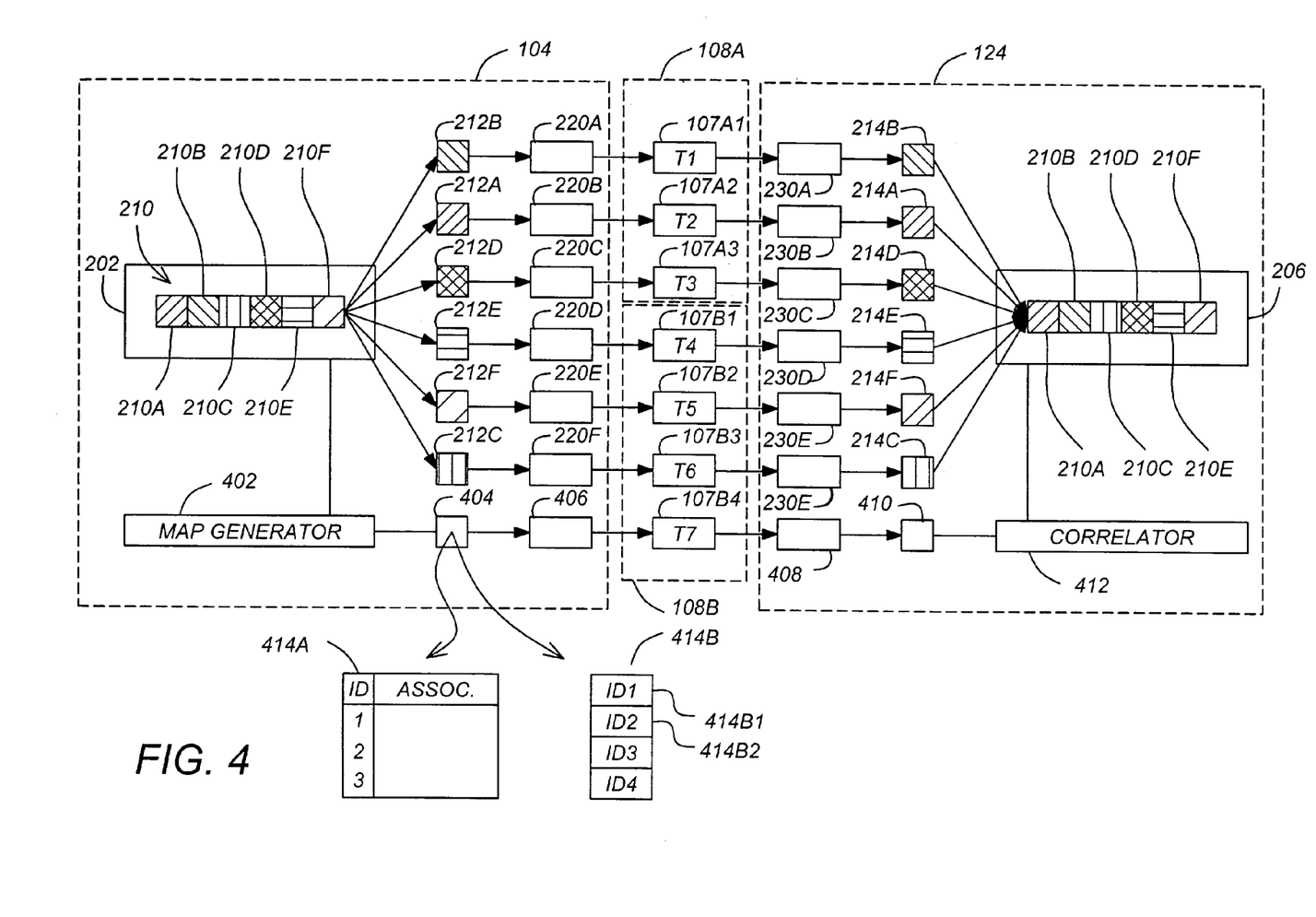
FIG. 4 is a diagram illustrating an alternative embodiment of the invention in which identifiers are transmitted in a map.

FIG. 4 is an illustration of another embodiment of the present invention. In this embodiment, the identifiers 302 associated with the component data streams that are used to reassemble the input data stream 210 are assembled into a map 414 that is periodically transmitted to the receiver station 124. In one embodiment, the map 414A maps identifiers 302 with associated component data streams. In a second embodiment, the map 414B is simply an ordered list of identifiers, thus indicating the order that the component data streams 214A–214F should be reassembled. In this embodiment, the uplink center 104 includes a map generator or data mapper 402 which interfaces with the inverse multiplexor 202 to generate a data stream 404 including a map such as map 414A and/or 414B (hereinafter alternatively referred to as maps 414). In the illustrated embodiment, the maps 414 are transmitted to the receiver station 124 via one of the satellites 108B using a separate channel transmitter 406, transponder (e.g. transponder 107B4), and channel receiver 406. In another embodiment, the map is transmitted via a different channel such as the PSTN, other land line, Internet, or dedicated communication link.

The correlator 412 receives the map, and interfaces with the multiplexor 206 to reassemble the received component data streams 214A–214F into the input data stream 210.

In one embodiment, the multiplexor 206 includes a buffer for buffering the received component data streams 214A–214F to allow the portions of the component data stream to be reassembled in the proper order (e.g. saving a data portion until all of the data portions which preceded it before inverse multiplexing and transmission have been received and processed).

FIG. 5 is a flow chart illustrating exemplary method steps that can be used to practice the present invention. The input data stream 210 is inverse multiplexed into a first component data stream 212A and a second component data stream 212B, as shown in block 502. The first and second component data streams 212A and 212B are provided to a first and second transponder (e.g. separate transponders), as shown in block 504. The first component data stream 212A is then broadcast by a first transponder 107A1 and the second component data stream 212B is broadcast by the second transponder (e.g. 107A2 or 107B1), as shown in block 506. The first and second component data streams 214A and 214B are received at the receiver station 124, as shown in block 508, and the input data stream 210 is reconstructed, as shown in block 510.

Figure 5A:
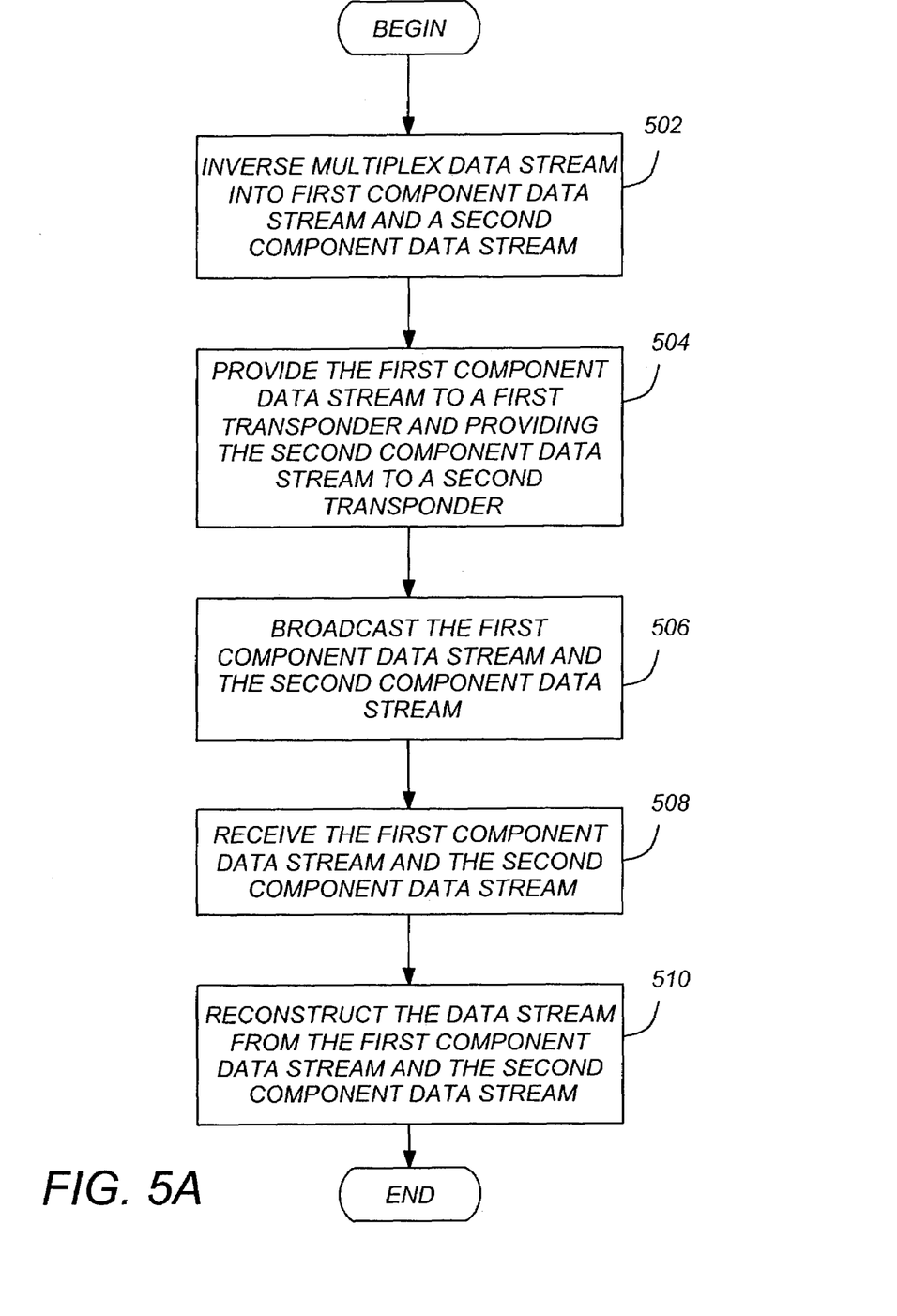
FIGS. 5A–5D are flow charts illustrating exemplary method steps that can be used to practice the present invention.
Figure 5B:
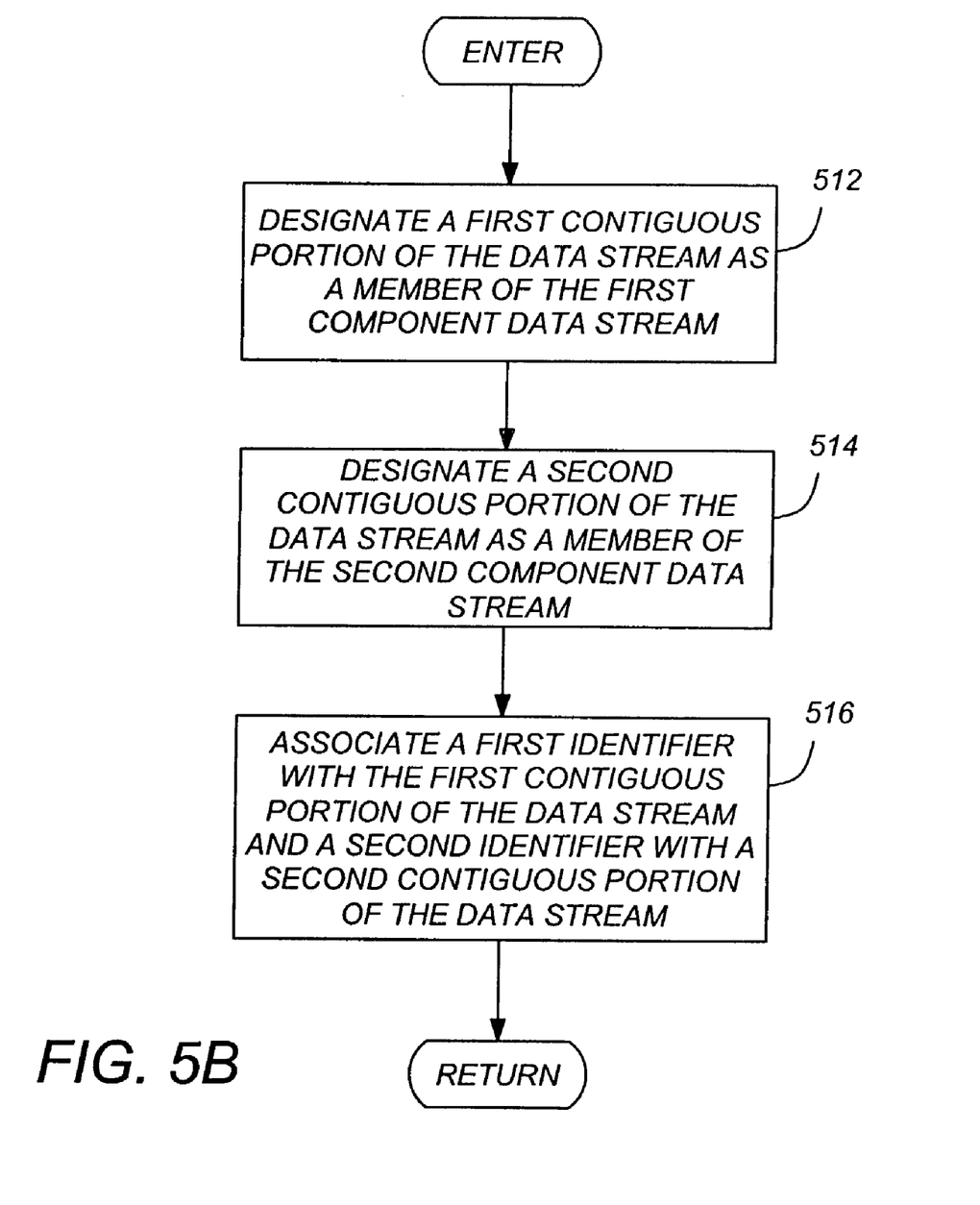

FIG. 5B is a flow chart showing exemplary method steps that can be used to inverse multiplex the input data stream 210 into component data streams 212A–212F. A first contiguous portion of the data stream 210A is designated as a member of the first component data stream 212A, and a second contiguous portion of the data stream 210B is designated as a member of the second component data stream 212B, as shown in blocks 512 and 514. A first identifier (414B1, for example) is associated with the first contiguous portion of the data stream 210A and a second identifier (414B2, for example) is associated with the second contiguous portion of the data stream 210B, as shown in block 516.

Figure 5C:
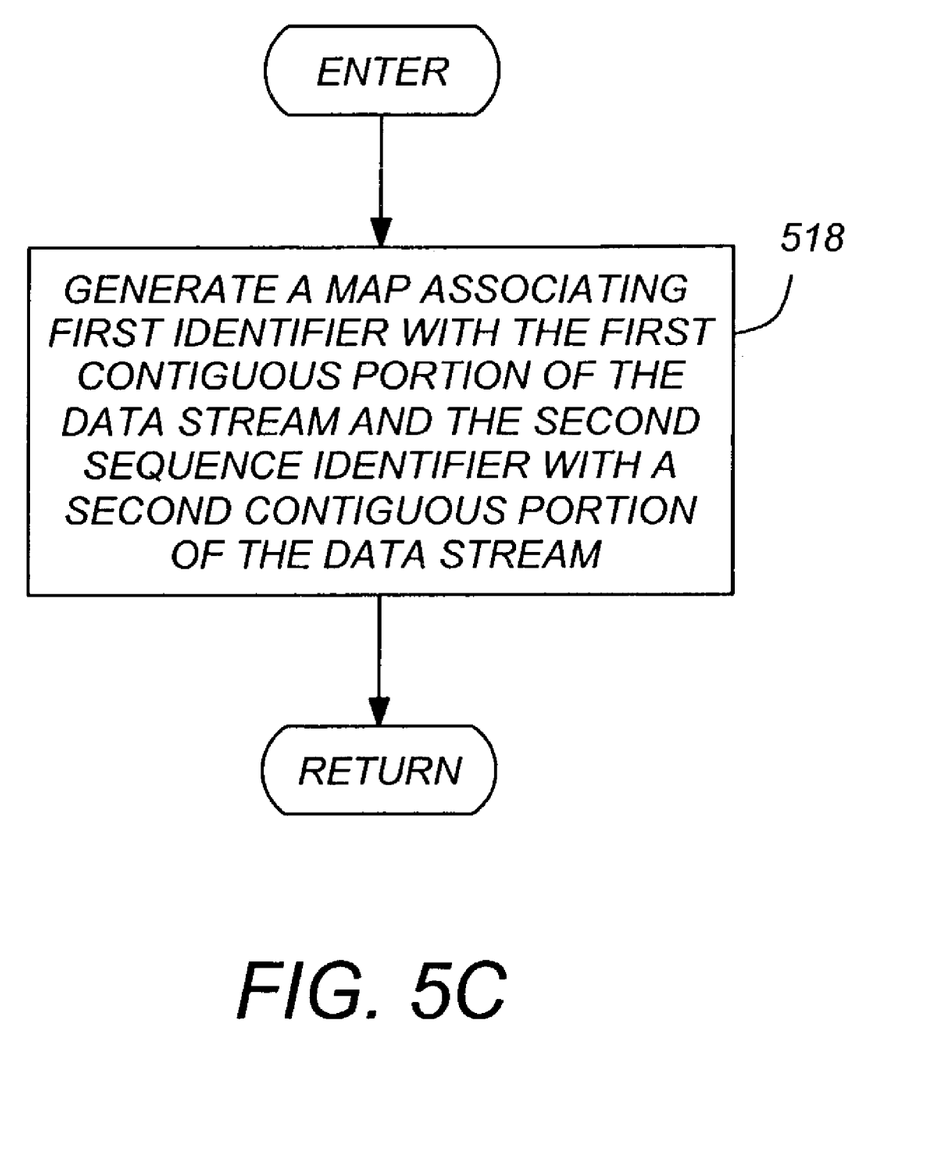

FIG. 5C is a flow chart illustrating exemplary method steps that can be used to associate the first identifier and the second identifier with their respective component data streams. In this embodiment, a map that associates the first and second identifiers with the first and second contiguous portions of the data steam is generated, as shown in block 518.

Figure 5D:
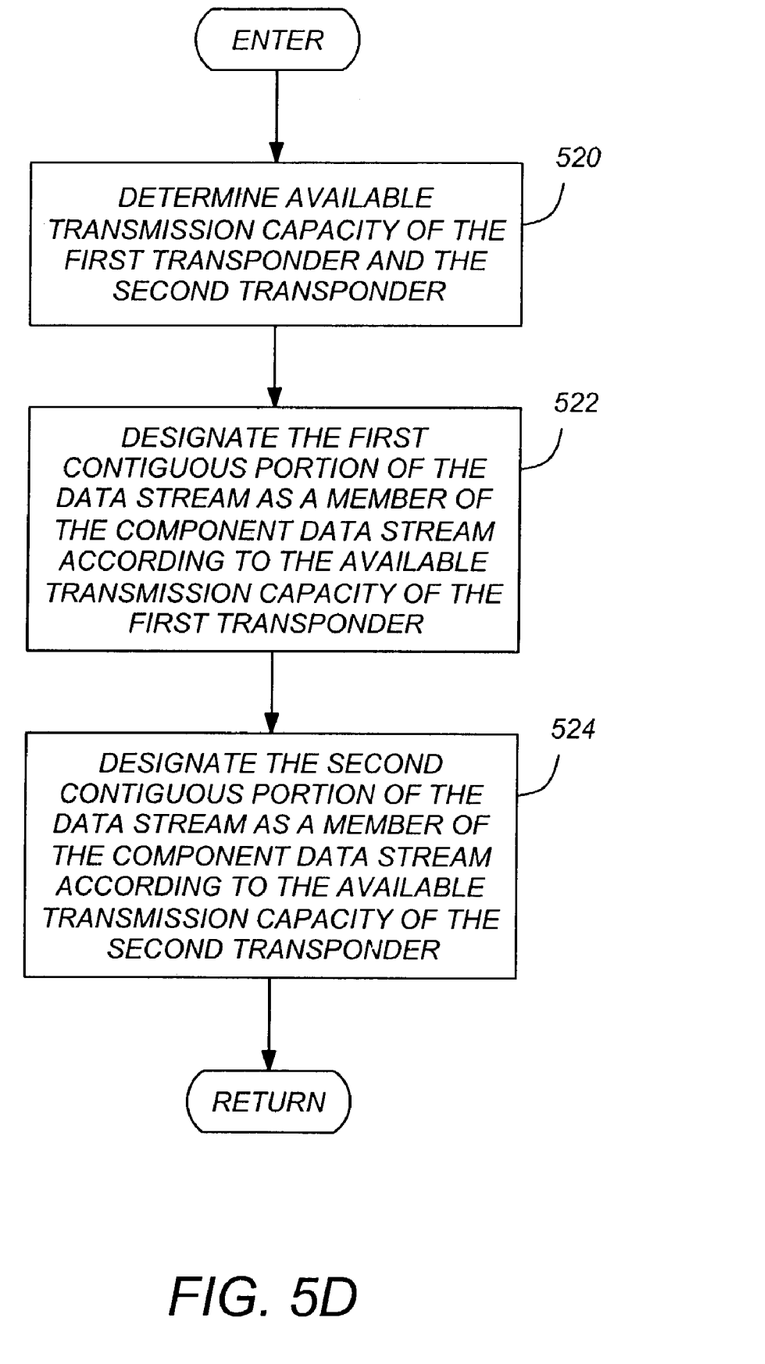

FIG. 5D is a flow chart illustrating exemplary method steps that can be used to inverse multiplex the input data stream 210 into component data streams 212A–212F. The available transmission capacity of the first transponder (e.g. 107A1) and the second transponder (e.g. 107A2) are determined in block 520. In one embodiment, the available transmission capacity of the transponders 107 can be determined by measuring the throughput (instantaneous or averaged over a selectable period of time) and determining the difference between the measured throughput and the transmission capacity of the transponders 107. In another embodiment, the throughput of the transponder is not measured, but estimated based on other factors that can either be predicted or measured. For example, throughput can be estimated based upon knowledge of the data supplied to the transponder 107. Such knowledge can include data metrics commonly available in statistical multiplexing techniques and the like. In some cases, the transponder output nominally includes some number empty data packets. In such cases, the number of such data packets can be used to determine the available transmission capacity of the transponder.

Further, in designating which data stream portions 210A–210F should be assigned to which transponders 107A1–107B3, the inverse multiplexor 202 may generate an optimized allocation of the available transmission capacity of all or a subset of the transponders 107A1–107B3. This can be accomplished by comparing predictions of the future data throughput of each transponder with the predicted data throughput requirements for the input data stream 210A–210F as well as other data streams of interest. Different data streams can be allocated according to customer priority, quality of service (QoS), or throughput requirements.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing has been described with respect to a video distribution system used primarily for purposes of distribution of films and the like to movie theaters, the video distribution system herein described can be used to transmit data of a variety of types, including software, audio, and electronic copies of books and/or other data. Further, while the foregoing has been described with respect to one way communications from the uplink center to the receiver station, the foregoing principles can be used to implement two way communications (e.g. from the receiver station to the uplink station or other ground station) by employing transmitter(s) and transmitting antennae at the receiver station and employing receiver(s) at the uplink center or ground station.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of transmitting a data stream, comprising the steps of:
   inverse multiplexing the data stream into a first component data stream and a second component data stream;
   providing the first component data stream to a first transponder and providing the second component data stream to a second transponder; and wherein the step of inverse multiplexing the data steam into a first component data stream and a second component data steam further comprises the steps of
determining an available transmission capacity of the first transponder and an available transmission capacity of the second transponder;
designating a first contiguous portion of the data steam as a member of the first component data stream according to the available transmission capacity of the first transponder; and
designating a second contiguous portion of the data stream temporally adjacent the first contiguous portion of the data steam as a member of the second component data stream according to the available transmission capacity of the second transponder.

2. The method of claim 1, wherein the step of inverse multiplexing the data stream into a first component data stream and a second component data steam comprises the steps of:
designating a firs: contiguous portion of the data steam as a member of the first component data stream;
designating a second contiguous portion of the data stream temp orally adjacent the first contiguous portion of the data stream as a member of the second component data stream; and
associating a first identifier with the first contiguous portion of the data stream and a second identifier with the second contiguous portion of the data stream.

3. The method of claim 2, wherein the first identifier is a first sequence identifier and the second identifier is a second sequence identifier.

4. The method of claim 3, wherein the step of associating a first identifier with the first contiguous portion of the data stream and a second identifier with the second contiguous pardon of the data stream comprises the steps of:
adding the first sequence identifier to the first contiguous portion of the data stream; and
adding the second sequence identifier to the second contiguous portion of the data stream.

5. The method of claim 4, wherein the first sequence identifier is appended to the first contiguous portion of die data stream and the second sequence identifier is appended to the second contiguous portion of the data stream.

6. The method of claim 4, wherein the first contiguous portion of the data stream is separated into a plurality of packets, each including a header and a portion of the first contiguous portion of the data scream.

7. The method of claim 3, wherein the step of associating a first sequence identifier with the first contiguous portion of the darn steam and a second sequence identifier with the second contiguous portion of the data stream comprises the steps of:
generating a map associating the first sequence identifier with the first contiguous portion of the data stream and the second sequence identifier with the second contiguous portion of the data stream.

8. The method of claim 7, further comprising the steps of:
receiving the first component data stream from the first transponder and the second component data stream from the second transponder;
receiving the map;
reconstructing the data stream from the received first component data stream and the received second component data scream by interleaving the first component data stream and the second data stream according to the first sequence identifier and the second sequence identifier.

9. The method of claim 8, wherein the map is received via a communication path independent of the first transponder and the second transponder.

10. The method of claim 3, further comprising the steps of
receiving the first component data stream from the first transponder and the second component data steam from the second transponder;
reconstructing the data stream from the received first component data stream and the received second component data stream by interleaving die first component data stream and the second data stream according to the first sequence identifier and the second sequence identifier.

11. The method of claim 1, further comprising the steps of: broadcasting the first component data stream using the first transponder; and broadcasting the second component data stream using the second transponder.

12. The method of claim 11, wherein the first transponder and the second transponder are disposed on a satellite.

13. The method of claim 11, wherein the firs: transponder and the second transponder are spatially diverse.

14. The method of claim 13, wherein the first transponder is disposed on a first satellite and the second transponder is disposed on a second satellite.

15. The method of claim 1, further comprising the steps of:
receiving the first component data stream from the first transponder and the second component data steam from the second transponder; and
reconstructing the data stream from the received first component data stream and the received second component data stream by interleaving the first component data stream and the second data stream.

16. The method of claim 15, wherein the step of reconstructing the data steam from the received first component data stream and the received second component data stream according to the sequence identifier comprises the steps of:
buffering the first component data stream and the second component data stream; and
reading the buffered first component data scream and the buffered second component data stream according to the first sequence identifier and the second sequence identifier.

17. The method of claim 1, wherein the step of determining an available transmission capacity of the first transponder and an available transmission capacity of the second transponder comprises the steps of:
determining the available transmission capacity of the first transponder by a difference between a transmission capacity of the first transponder and a measured throughput of the first transponder; and
determining the available transmission capacity of the second transponder by a difference between a transmission capacity of the second transponder and a measured throughput of the second transponder.

18. The method of claim 17, wherein the measured throughput is an average throughput over a measurement period.

19. The method of claim 1, wherein the step of determining an available transmission capacity of the first transponder and an available transmission capacity of the second transponder comprises the steps of:
determining the available transmission capacity of the first transponder by a difference between a transmission capacity of the first transponder and an estimated throughput of the first transponder; and determining the available transmission capacity of the second transponder by a difference between a transmission capacity of the second transponder and an estimated throughput of the second transponder.

20. The method of claim 1, further comprising the step of: generating an optimized allocation of the available transmission capacity of the first transponder and the available transmission capacity of the second transponder.

21. An apparatus for transmitting a data steam, comprising:
   means for inverse multiplexing the data stream into a first component data stream and a second component data stream;
   means for providing the first component data steam to a first transponder and providing the second component data stream to a second transponder; and
   wherein the means for inverse multiplexing the data stream into a first component data stream and a second component data stream further comprises
      means for determining an available transmission capacity of the first transponder and an available transmission capacity of the second transponder;
      means for designating a first contiguous portion of the data stream a member of the first component data stream according to the available transmission capacity of the first transponder; and
      means for designating a second contiguous portion of the data stream temporally adjacent the first contiguous pardon of the data stream as a member of the second component data stream according to the available transmission capacity of the second transponder.

22. The apparatus of claim 21, wherein the inverse multiplexer comprises:
   means for designating a first contiguous portion of the data stream as a member of the first component data stream;
   means for designating a second contiguous portion of the data stream temporally adjacent the first contiguous portion of the data stream as a member of the second component data stream; and
   means for associating a first identifier with the first contiguous portion of the data stream and a second identifier with the second contiguous portion of the data stream.

23. The apparatus of claim 22, wherein the first identifier is a first sequence identifier and the second identifier is a second sequence identifier.

24. The apparatus of claim 23, wherein the means for associating a first identifier with the first contiguous portion of the data stream and a second identifier with the second contiguous portion of the data stream comprises:
   means for adding the first sequence identifier to the first contiguous portion of the data stream; and
   means for adding the second sequence identifier to die second contiguous portion of the data stream.

25. The apparatus of claim 24, wherein the first sequence identifier is appended to the first contiguous portion of the data stream and the second sequence identifier is appended to die second contiguous portion of the data steam.

26. The apparatus of claim 24, wherein the first contiguous portion of the data stream is separated into a plurality of packets, each including a header and a portion of die first contiguous portion of the data stream.

27. The apparatus of claim 23, wherein the means for associating a first sequence identifier with the first contiguous portion of the darn stream and a second sequence identifier with the second contiguous portion of the data stream comprises:
   means for generating a map associating the first sequence identifier with die first contiguous portion of the data steam and the second sequence identifier with the second contiguous portion of she data stream.

28. The apparatus of claim 27, father comprising:
   means for receiving the first component data steam from the first transponder and the second component data stream from the second transponder;
   means for receiving the map;
   means for reconstructing the data steam from the received first component data stream and the received second component data stream by interleaving the first component data stream and the second data stream according to the first sequence identifier and the second sequence identifier.

29. The apparatus of claim 28, wherein the map is received via a communication path independent of the first transponder and the second transponder.

30. The apparatus of claim 23, further comprising:
   means for receiving the first component data stream from the first transponder and the second component data steam from the second transponder; and
   means for reconstructing the data stream from the received first component data steam and the received second component data stream by interleaving the first component data steam and the second data stream according to the first sequence identifier and the second sequence identifier.

31. The apparatus of claim 21, fattier comprising:
   means for broadcasting the first component data steam; and
   means for broadcasting the second component data stream.

32. The apparatus of claim 31, wherein the means for broadcasting the first component data stream and the means for broadcasting the second component data stream are disposed on a satellite.

33. The apparatus of claim 31, wherein the means for broadcasting the first component data stream and the means for broadcasting the second component data steam are spatially diverse.

34. The apparatus of claim 33, wherein the means for broadcasting the first component data stream is disposed on a first satellite and the means for broadcasting the second component data stream is disposed on a second satellite.

35. The apparatus of claim 21, further comprising:
   means for receiving the first component data stream from the first transponder and the second component data stream from the second transponder; and
   means for reconstructing the data stream from the received first component data steam and the received second component data stream by interleaving the first component data stream and the second data stream.

36. The apparatus of claim 35, wherein die means for reconstructing the data stream from the received first component data stream and the received second component data stream according to the sequence identifier comprises:
   means for buffering the first component data stream and the second component data stream; and
   means for reading the buffered first component data steam and the buffered second component data stream according to the first sequence identifier and the second sequence identifier.

37. The apparatus of claim 21, wherein the means for determining an available transmission capacity of the first transponder and an available transmission capacity of the second transponder comprises:
  means for determining the available transmission capacity of the first transponder by a difference between a transmission capacity of the first transponder and a measured throughput of the first transponder; and
  means for determining die available transmission capacity of the second transponder by a difference between a transmission capacity of the second transponder and a measured throughput of the second transponder.

38. The apparatus of claim 37, wherein the measured throughput is an average throughput over a measurement period.

39. The apparatus of claim 21, wherein the means for determining an available transmission capacity of the first transponder and an available transmission capacity of the second transponder comprises:
  means for determining the available transmission capacity of the first transponder by a difference between a transmission capacity of the first transponder and an estimated throughput of the first transponder; and
  means for determining the available transmission capacity of the second transponder by a difference between a transmission capacity of the second transponder and an estimated throughput of the second transponder.

40. The apparatus of claim 21, further comprising:
  means for generating an optimized allocation of the available transmission capacity of the first transponder and the available transmission capacity of the second transponder.

41. An apparatus for transmitting a data stream, comprising:
  an inverse multiplexer, communicatively coupled to the data steam, for separating the data stream into a first component data stream and a second component data steam;
  an uplink transmitter, for providing the first component data stream to a first transponder and providing the second component data stream to a second transponder; and
  wherein the inverse multiplexer comprises
    means for determining an available transmission capacity of the first transponder and an available transmission capacity of the second transponder;
    means for designating a first contiguous portion of the data stream as a member of the first component data stream according to the available transmission capacity of the first transponder; and
    means for designating a second contiguous portion of the data stream temporally adjacent the first contiguous portion of the data stream as a member of the second component data steam according to the available transmission capacity of the second transponder.

42. The apparatus of claim 41, wherein the inverse multiplexer comprises:
  means for designating a first contiguous portion of the data stream as a member of the first component data stream;
  means for designating a second contiguous portion of the data stream temporally adjacent the first contiguous portion of the data stream as a member of the second component data stream; and
  associating a first identifier with the first contiguous portion of the data stream arid a second identifier with the second contiguous portion of the data stream.

43. The apparatus of claim 42, wherein the first identifier is a first sequence identifier and the second identifier is a second sequence identifier.

44. The apparatus of claim 43, wherein the means for associating a first identifier with the first contiguous portion of the data stream and a second identifier with the second contiguous portion of the data stream comprises:
  means for adding the first sequence identifier to the first contiguous portion of the data stream; and
  means for adding the second sequence identifier to the second contiguous portion of the data stream.

45. The apparatus of claim 44, wherein the first sequence identifier is appended to the first contiguous portion of the data stream and the second sequence identifier is appended to the second contiguous portion of the data stream.

46. The apparatus of claim 44, wherein the first contiguous portion of the data scream is separated into a plurality of packets, each including a header and a portion of the first contiguous portion of the data stream.

47. The apparatus of claim 43, wherein the means for associating a first sequence identifier with the first contiguous portion of the darn stream and a second sequence identifier with the second contiguous portion of the data stream comprises:
  a data mapper, for generating a map associating the first sequence identifier with the first contiguous portion of the data stream and the second sequence identifier with the second contiguous portion of the data stream.

48. The apparatus of claim 47, further comprising:
  a receive; comprising
    a tuner for receiving the first component data stream from the first transponder and the second component data stream from the second transponder and for receiving the map;
    a processor, communicatively coupled to the tuner, the processor for reconstructing the data stream from the received first component data steam and the received second component data stream by interleaving the first component data stream and the second data stream according to the first sequence identifier and the second sequence identifier.

49. The apparatus of claim 48, wherein the map is received via a communication path independent of the first transponder and the second transponder.

50. The apparatus of claim 43, further comprising:
  a receiver, comprising:
    a tuner for receiving the first component data stream from the first transponder and the second component data stream from the second transponder; and
    a communicatively coupled to the rune; the processor for reconstructing the data stream from the received first component data stream and the received second component data stream by interleaving the first component data stream and the second data stream according to the first sequence identifier and the second sequence identifier.

51. The apparatus of claim 41, further comprising:
  the first transponder; and
  the second transponder.

52. The apparatus of claim 51, wherein the first transponder and the second transponder are disposed on a satellite.

53. The apparatus of claim 51, wherein the first transponder and the second transponder are spatially diverse.

54. The apparatus of claim 53, wherein the first transponder is disposed on a first satellite and the second transponder is disposed on a second satellite.

55. The apparatus of claim 41, further comprising:
a receiver, comprising:
  a tuner for receiving the first component data steam from the first transponder and the second component data steam from the second transponder; and
  a processor, communicatively coupled to the timer, the processor for reconstructing the data stream from the received first component data steam and the received second component data stream by interleaving the first component data stream and the second data stream.

56. The apparatus of claim 41, wherein the means for determining an available transmission capacity off the first transponder and an available transmission capacity of the second transponder comprises:
  means for determining the available transmission capacity of the first transponder by a difference between a transmission capacity of the first transponder and a measured throughput of the first transponder; and
  means for determining the available transmission capacity of the second transponder by a difference between a transmission capacity of the second transponder and a measured throughput of the second transponder.

57. The apparatus of claim 56, wherein the measured throughput is an average throughput over a measurement period.

58. The apparatus of claim 41, wherein the means for determining an available transmission capacity of the first transponder and an available transmission capacity of the second transponder comprises:
  means for determining the available transmission capacity of the first transponder by a difference between a transmission capacity of the first transponder and an estimated throughput of the first transponder; and
  means for determining the available transmission capacity of she second transponder by a difference between a transmission capacity of the second transponder and an estimated throughput of the second transponder.

59. The apparatus of claim 55, wherein the means for reconstructing the data stream from the received first component data stream and the received second component data stream according to the sequence identifier comprises:
  a buffer, communicatively coupled to the receiver, for storing the first component data stream and the second component data stream; and
  wherein the processor reads the buffered first component data stream end the buffered second component data stream according to the first sequence identifier and the second sequence identifier.

60. The apparatus of claim 41, further comprising:
  means for generating an optimized allocation of the available transmission capacity of the first transponder and the available transmission capacity of the second transponder.

* * * * *